US010743252B2

(12) United States Patent
Liu

(10) Patent No.: US 10,743,252 B2
(45) Date of Patent: Aug. 11, 2020

(54) METHOD FOR IDENTIFYING ACCESS POINT AND HOTSPOT AND TERMINAL

(71) Applicant: Guangdong Oppo Mobile Telecommunications Corp., Ltd., Dongguan, Guangdong (CN)

(72) Inventor: Wenjie Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/253,623

(22) Filed: Jan. 22, 2019

(65) Prior Publication Data

US 2019/0200287 A1 Jun. 27, 2019

Related U.S. Application Data

(63) Continuation of application No. PCT/CN2017/101467, filed on Sep. 12, 2017.

(30) Foreign Application Priority Data

Dec. 7, 2016 (CN) .......................... 2016 1 1117899

(51) Int. Cl.
*H04W 48/20* (2009.01)
*H04W 28/02* (2009.01)
*H04W 48/16* (2009.01)
*G06F 8/65* (2018.01)

(52) U.S. Cl.
CPC .............. *H04W 48/20* (2013.01); *G06F 8/65* (2013.01); *H04W 28/0247* (2013.01); *H04W 28/0284* (2013.01); *H04W 48/16* (2013.01)

(58) Field of Classification Search
CPC ............. H04W 48/20; H04W 28/0247; H04W 28/0284; H04W 48/16
See application file for complete search history.

(56) References Cited

U.S. PATENT DOCUMENTS

| 2012/0176946 A1 | 7/2012 | Hunt et al. |
| 2015/0089595 A1 | 3/2015 | Telles et al. |
| 2017/0013549 A1* | 1/2017 | Ou .................. H04W 48/16 |

FOREIGN PATENT DOCUMENTS

| CN | 103313429 A | 9/2013 |
| CN | 103442376 A | 12/2013 |
| CN | 104185294 A | 12/2014 |

(Continued)

OTHER PUBLICATIONS

International search report issued in corresponding international application No. PCT/CN2017/101467 dated Nov. 30, 2017.

(Continued)

*Primary Examiner* — Ronald B Abelson

(57) ABSTRACT

A method for identifying an access point and a hotspot and a terminal are provided. The method includes the following. An internet protocol (IP) address of a gateway is obtained when a terminal is in a wireless fidelity (Wi-Fi) connection state. Whether a preset Wi-Fi list contains the IP address is determined. The terminal is determined to be connected to a hotspot when the preset Wi-Fi list contains the IP address. The terminal is determined to be connected to an access point when the preset Wi-Fi list does not contain the IP address.

20 Claims, 7 Drawing Sheets

(56) References Cited

FOREIGN PATENT DOCUMENTS

| CN | 105142217 A | 12/2015 |
|---|---|---|
| CN | 105307242 A | 2/2016 |
| CN | 105550003 A | 5/2016 |
| CN | 105578492 A | 5/2016 |
| CN | 105636079 A | 6/2016 |
| WO | 2016000589 A1 | 1/2016 |

OTHER PUBLICATIONS

European Search Report issued in corresponding European Application No. 17877516.9 dated Sep. 20, 2019.

* cited by examiner

METHOD FOR IDENTIFYING ACCESS POINT AND HOTSPOT AND TERMINAL

CROSS-REFERENCE TO RELATED APPLICATION(S)

This application is a continuation of International Application No. PCT/CN2017/101467, filed on Sep. 12, 2017, which claims priority to Chinese Patent Application No. 201611117899.0, filed on Dec. 7, 2016, the disclosures of both of which are hereby incorporated by reference.

TECHNICAL FIELD

The present disclosure relates to the field of Internet technology, and more particularly to a method for identifying an access point and a hotspot and a terminal.

BACKGROUND

With the rapid development of information technology, terminals (such as mobile phones, tablets, etc.) are becoming more and more popular. The performance of the terminals required by users is increasingly higher, not only high processing speed is required, but also the consumption of traffic of the terminals is cared by the users.

In the related art, generally, when the terminal is in a Wi-Fi® connection, the terminal determines by default that network communication can be conducted via a wireless fidelity (Wi-Fi).

SUMMARY

A method for identifying an access point and a hotspot, a terminal, and a non-transitory computer-readable storage medium are provided according to embodiments of the present disclosure.

In a first aspect of the present disclosure, a method for identifying an access point and a hotspot is provided. The method includes the following.

An internet protocol (IP) address of a gateway is obtained when a terminal is in a Wi-Fi connection state. Whether a preset Wi-Fi list contains the IP address is determined. The terminal is determined to be connected to a hotspot, based on a determination that the preset Wi-Fi list contains the IP address. The terminal is determined to be connected to an access point, based on a determination that the preset Wi-Fi list fails to contain the IP address.

In a second aspect of the present disclosure, a terminal is provided. The terminal includes at least one processor and a computer readable memory, coupled to the at least one processor and storing at least one computer executable instruction therein, which when executed by the at least one processor, causes the at least one processor to carry out the following actions. An internet protocol (IP) address of a gateway is obtained when the terminal is in a Wi-Fi connection state. Whether a preset Wi-Fi list contains the IP address is determined. The terminal is determined to be connected to a hotspot, based on a determination that the preset Wi-Fi list contains the IP address. The terminal is determined to be connected to an access point, based on a determination that the preset Wi-Fi list fails to contain the IP address.

In a third aspect of the present disclosure, a non-transitory computer-readable storage medium is provided. The medium stores at least one computer program which, when executed by at least one processor, causes the at least one processor to carry out the following actions. An internet protocol (IP) address of a gateway is obtained when a terminal is in a Wi-Fi connection state. Whether a preset Wi-Fi list contains the IP address is determined. The terminal is determined to be connected to a hotspot, based on a determination that the preset Wi-Fi list contains the IP address. The terminal is determined to be connected to an access point, based on a determination that the preset Wi-Fi list fails to contain the IP address.

BRIEF DESCRIPTION OF DRAWINGS

To describe technical solutions in embodiments of the present disclosure more clearly, the following briefly introduces the accompanying drawings required for describing the embodiments. Apparently, the accompanying drawings in the following description merely illustrate some embodiments of the present disclosure. Those of ordinary skill in the art may also obtain other drawings based on these accompanying drawings without creative efforts.

DETAILED DESCRIPTION

Figure 1:
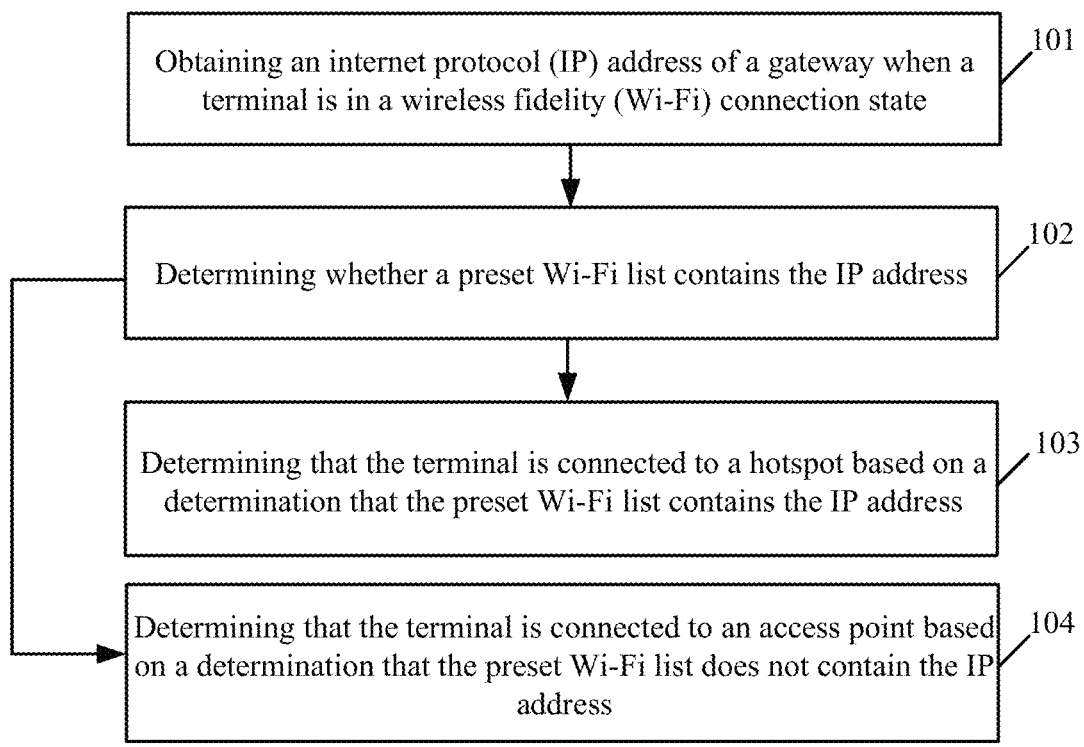
FIG. 1 is a flow chart illustrating a method for identifying an access point and a hotspot according to a first embodiment of the present disclosure.

In general, when in a wireless fidelity (Wi-Fi) connection, a terminal automatically updates at least one application to-be-upgraded by default. At this point, if the terminal is connected to a hotspot shared by another terminal, that is, a hotspot configured via a mobile communication network (e.g., 2G, 3G, 4G, etc.), the another terminal generates more data traffic. However, at present, the terminal is unable to distinguish between a hotspot configured via the mobile communication network and an access point configured via a router. To this end, embodiments of the present disclosure provide a method for identifying an access point and a hotspot, and related products, which can distinguish between an access point and a hotspot.

Hereinafter, technical solutions embodied by the embodiments of the disclosure will be described in a clear and comprehensive manner in reference to the accompanying drawings intended for the embodiments. It is evident that the embodiments described herein constitute merely some rather than all of the embodiments of the disclosure. Based on the embodiments of the present disclosure, other embodiments derived by those of ordinary skill in the art without creative efforts all fall in the protection scope of the present disclosure.

"Terminal" in the embodiments of the disclosure may include smart phones (such as Android® phones, iOS® phones, Windows Phones, etc.), tablet PCs, palmtops, on-board equipment, laptops, mobile Internet devices (MID), wearable devices, or the like. The above-mentioned terminals are merely illustrative and not exhaustive, including but not limited to the above-described terminals.

Generally, a router is equipped with a dynamic host configuration protocol (DHCP) server. The DHCP server can assign an internet protocol (IP) address to a terminal, that is, an IP address of the terminal. An IP address of a gateway is attached to an Offer message and an acknowledgement (ACK) message replied by the DHCP server in a process that the terminal obtains an IP address through a DHCP protocol. A routing path is formed between the IP address of the terminal and the IP address of the gateway. The terminal is in communication with the router via the routing path, that is, data transmission can be performed between the terminal and the router.

In a first aspect, a method for identifying an access point and a hotspot is provided. The method includes the following. An internet protocol (IP) address of a gateway is obtained when a terminal is in a Wi-Fi connection state. Whether a preset Wi-Fi list contains the IP address is determined. The terminal is determined to be connected to a hotspot, based on a determination that the preset Wi-Fi list contains the IP address. The terminal is determined to be connected to an access point, based on a determination that the preset Wi-Fi list fails to contain the IP address.

In the illustrated embodiment, the preset Wi-Fi list contains at least one of 192.168.40.X and 172.20.19.Y, and X and Y are integers ranging from 0 to 255.

In the illustrated embodiment, the method further comprises the following after determining that the terminal is connected to the hotspot. Total traffic required to upgrade at least one application to-be-upgraded is estimated. An upgrade request is sent to the hotspot, where the upgrade request carries information for indicating the total traffic. The at least one application to-be-upgraded is upgraded upon receipt of a confirmation message that is transmitted by the hotspot in response to the upgrade request.

In the illustrated embodiment, the at least one application to-be-upgraded includes multiple applications to-be-upgraded. Estimating the total traffic required to upgrade the at least one application to-be-upgraded includes the following. Traffic required by upgrade of each of the applications to-be-upgraded is estimated. The total traffic is obtained by adding up the traffic required by upgrade of each of the applications to-be-upgraded.

In the illustrated embodiment, the at least one application to-be-upgraded includes multiple applications to-be-upgraded. Upgrading the at least one application to-be-upgraded includes the following. A usage frequency of each of the applications to-be-upgraded is obtained. All the applications to-be-upgraded are upgraded in descending order of the usage frequency of each of the applications to-be-upgraded.

In the illustrated embodiment, the at least one application to-be-upgraded includes multiple applications to-be-upgraded. Upgrading the at least one application to-be-upgraded includes the following. Traffic required by upgrade of each of the applications to-be-upgraded is determined. All the applications to-be-upgraded are upgraded in ascending order of the traffic required by upgrade of each of the applications to-be-upgraded.

In the illustrated embodiment, the at least one application to-be-upgraded includes multiple applications to-be-upgraded. Upgrading the at least one application to-be-upgraded includes the following. A plurality of categories is obtained by classifying the applications to-be-upgraded. A priority of each of the categories is determined. All the applications to-be-upgraded are upgraded according to the priority of each of the categories.

In the illustrated embodiment, the method further includes the following after determining that the terminal is connected to the access point. At least one application to-be-upgraded is upgraded.

In the illustrated embodiment, the at least one application to-be-upgraded includes multiple applications to-be-upgraded. Upgrading the at least one application to-be-upgraded includes the following. Whether a current network transmission rate is higher than a preset threshold is determined. All the applications to-be-upgraded are upgraded based on a determination that the current network transmission rate is higher than the preset threshold. Part of the applications to-be-upgraded are upgraded based on a determination that the current network transmission rate is lower than or equal to the preset threshold.

In a second aspect, a terminal is provided. The terminal includes at least one processor and a computer readable memory, coupled to the at least one processor and storing at least one computer executable instruction therein, which when executed by the at least one processor, causes the at least one processor to carry out the following actions. An internet protocol (IP) address of a gateway is obtained when the terminal is in a Wi-Fi connection state. Whether a preset Wi-Fi list contains the IP address is determined. The terminal is determined to be connected to a hotspot, based on a determination that the preset Wi-Fi list contains the IP address. The terminal is determined to be connected to an access point, based on a determination that the preset Wi-Fi list fails to contain the IP address.

In a third aspect, a non-transitory computer-readable storage medium is provided. The medium stores at least one computer program which, when executed by at least one processor, causes the at least one processor to carry out the following actions. An internet protocol (IP) address of a gateway is obtained when a terminal is in a Wi-Fi connection state. Whether a preset Wi-Fi list contains the IP address is determined. The terminal is determined to be connected to a hotspot, based on a determination that the preset Wi-Fi list contains the IP address. The terminal is determined to be connected to an access point, based on a determination that the preset Wi-Fi list fails to contain the IP address.

FIG. 1 is a flow chart illustrating a method for identifying an access point and a hotspot according to a first embodiment of the present disclosure. The method provided in the first embodiment includes the following.

At block 101, an IP address of a gateway is obtained when a terminal is in a Wi-Fi connection state.

When the terminal is in the Wi-Fi connection state, the terminal may be connected to a hotspot configured via a mobile communication network (e.g., 2G, 3G, 4G, etc.), or connected to a access point configured via a router. The hotspot is configured on a device such as a smart phone with the mobile communication network to allow Internet access to other devices via Bluetooth® pairing or other. The access point for example may be created by a business for use by customers, such as coffee shops or hotels. The access point is typically created via a wireless local area network (WLAN) using a router connected to an internet service provider. In the process of connecting the terminal to the access point, a DHCP server built in the router can assign an IP address to the terminal, where the IP address is referred to as an IP address of a gateway. In the process of connecting the terminal to the hotspot, the hotspot can assign an IP address to the terminal, where the IP address is also referred to as an IP address of a gateway. Since different objects can act as different gateways, IP addresses of different gateways are different accordingly. Therefore, by merely distinguishing IP addresses of gateways, it can be determined whether the IP address of the gateway is an IP address of the hotspot or an IP address of the access point.

In the illustrated embodiment, when the terminal is in the Wi-Fi connection state, a routing path (i.e., a routing path formed between the IP address of the terminal and the IP address of the gateway, the routing path can be used to receive or transmit data) can be obtained, and the IP address of the gateway can be obtained from the routing path.

At block 102, whether a preset Wi-Fi list contains the IP address is determined.

Figure 2:
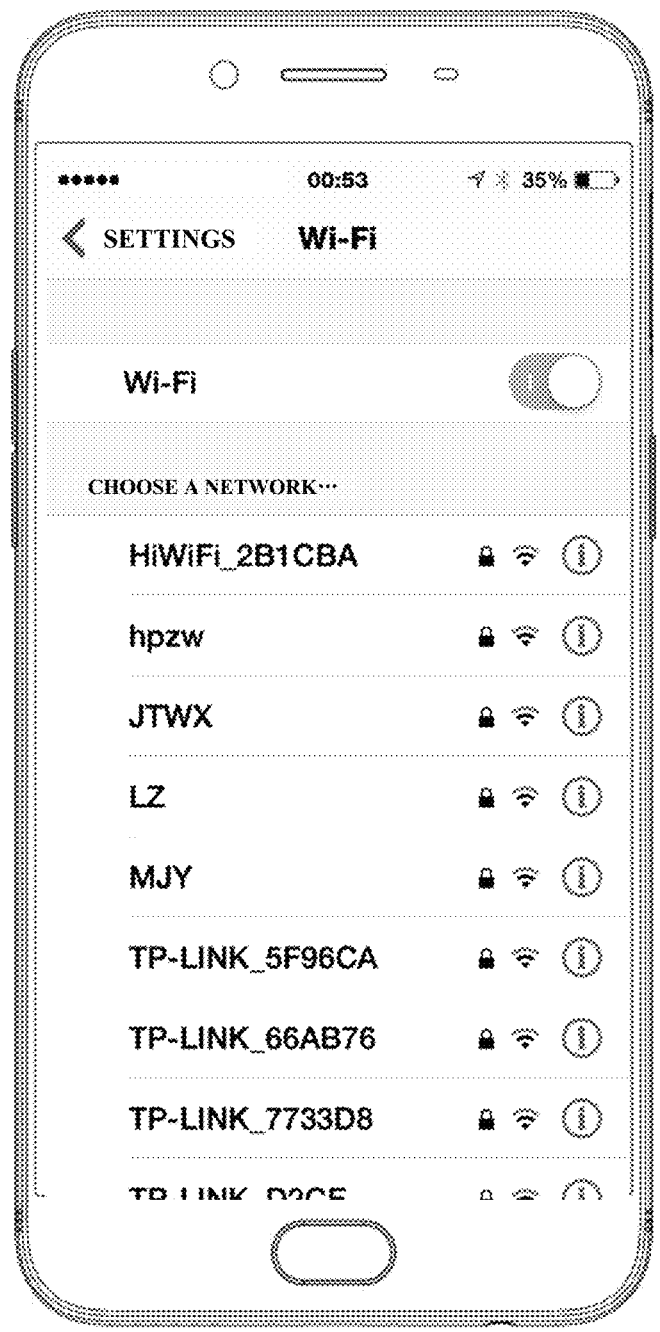
FIG. 2 is a schematic diagram illustrating a Wi-Fi list according to an embodiment of the present disclosure.

The preset Wi-Fi list may be pre-stored in the terminal before the operation at block 101. Generally, an IP address assigned by the hotspot has certain characteristics, and so part of IP addresses assigned by the hotspot can be stored to form the preset Wi-Fi list. Therefore, when the IP address is contained in the preset Wi-Fi list, it means that the terminal is connected to the hotspot; when the IP address is not contained in the preset Wi-Fi list, it means that the terminal is connected to the access point. As illustrated in FIG. 2, a schematic diagram illustrating the preset Wi-Fi list is provided.

The preset Wi-Fi list contains at least one of 192.168.40.X and 172.20.19.Y, where X and Y are integers ranging from 0 to 255. For example, when the IP address of the gateway is 192.168.40.1, it indicates that the terminal is connected to the hotspot. Furthermore, along with the evolution of technologies, the standard of communication may also change. In this case, the preset Wi-Fi list mentioned above may be re-defined.

At block 103, the terminal is determined to be connected to the hotspot based on a determination that the preset Wi-Fi list contains the IP address.

At block 104, the terminal is determined to be connected to the access point based on a determination that the preset Wi-Fi list does not contain the IP address.

When the preset Wi-Fi list contains the IP address, it indicates that the terminal is connected to the hotspot. When the preset Wi-Fi list does not contain the IP address, it indicates that the terminal is connected to the access point. Therefore, it can be determined whether the terminal is connected to the access point configured via the router or the hotspot configured via the mobile communication network when the terminal is in the Wi-Fi connection state. When the terminal is connected to the hotspot, since the hotspot is based on the mobile communication network (e.g., 2G, 3G, 4G, etc.), charging of traffic is often expensive. In this case, when part of applications in the terminal need to be upgraded, much traffic is required to be consumed. When the terminal is connected to the access point, since the access point is based on the router, it is not necessary to consider the consumption of traffic, therefore, in this situation, applications in the terminal which need to be upgraded can be upgraded.

What needs to be illustrated is that, in general, the terminal can obtain the IP address of the gateway when the terminal is in the Wi-Fi connection state, and determine whether the preset Wi-Fi list contains the IP address. The preset Wi-Fi list contains at least one of 192.168.40.X and 172.20.19.Y, where X and Y are integers ranging from 0 to 255. When the preset Wi-Fi list contains the IP address of the current gateway, it means that the terminal is connected to the hotspot; otherwise, it means that the terminal is connected to the access point.

It can be seen that, by means of the embodiments of the present disclosure, the IP address of the gateway is obtained when the terminal is in the Wi-Fi connection state. Whether the preset Wi-Fi list contains the IP address is determined. The terminal is determined to be connected to the hotspot when the preset Wi-Fi list contains the IP address. The terminal is determined to be connected to the access point when the preset Wi-Fi list does not contain the IP address. Therefore, whether the terminal is connected to the hotspot or the access point can be distinguished.

Figure 3:
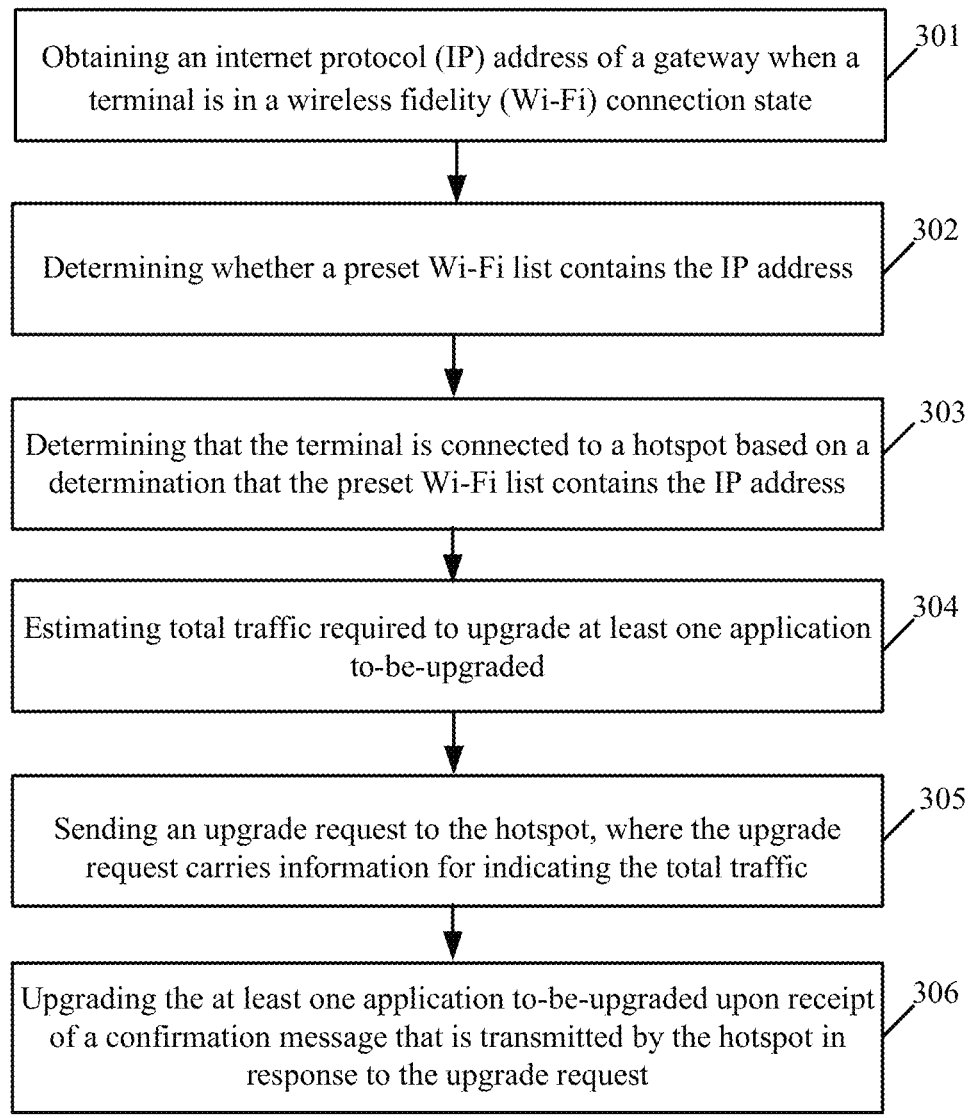
FIG. 3 is a flow chart illustrating a method for identifying an access point and a hotspot according to a second embodiment of the present disclosure.

Consistent with the above embodiment, FIG. 3 is a flow chart illustrating a method for identifying an access point and a hotspot according to a second embodiment of the present disclosure. The method provided in the second embodiment includes the following.

At block 301, an IP address of a gateway is obtained when a terminal is in a Wi-Fi connection state.

At block 302, whether a preset Wi-Fi list contains the IP address is determined.

At block 303, the terminal is determined to be connected to a hotspot based on a determination that the preset Wi-Fi list contains the IP address.

For the operations at block 301 to 303, reference can be made to the corresponding operations of the method described in conjunction with FIG. 1, which will not be repeated herein.

At block 304, total traffic required to upgrade at least one application to-be-upgraded is estimated.

The at least one application to-be-upgraded may include one or more applications. Applications that need to be upgraded are collectively referred to as applications to-be-upgraded. For different applications, traffic that needs to be consumed during upgrade operation may be different. Therefore, the traffic that needs to be consumed during upgrade operation of each application to-be-upgraded needs to be estimated. The at least one application to-be-upgraded includes, but is not limited to, a map application (referring to an application mainly configured for providing map-related functions, for example, position search, position navigation, and so on), an instant messenger application (referring to an application mainly configured for providing communication-related functions, for example, text chatting, video call, and so on), a social application (referring to an application mainly configured for providing social functions, for example, providing online news and social networking service), a group purchase application (referring to an application mainly configured for providing group-buying), a browser application, a payment application, and the like. The at least one application to-be-upgraded may include one or more applications to-be-upgraded. When the at least one application to-be-upgraded includes one application to-be-upgraded, the amount of traffic required to upgrade the application to-be-upgraded to the latest version can be estimated. The current version of the application to-be-upgraded can be compared with the latest version to determine the amount of data to-be-downloaded, and the traffic consumed by upgrade of the application to-be-upgraded can be estimated according to the amount of data.

The at least one application to-be-upgraded includes multiple applications to-be-upgraded. For the operation at block 304, the total traffic required to upgrade the at least one application to-be-upgraded is estimated as follows.

Traffic required by upgrade of each application to-be-upgraded is estimated. The total traffic is obtained by adding up the traffic required by upgrade of each application to-be-upgraded.

When the at least one application to-be-upgraded includes multiple applications to-be-upgraded, the traffic required by upgrade of each application to-be-upgraded can be estimated, and then the total traffic required to upgrade the applications to-be-upgraded can be obtained by adding up the traffic required by upgrade of each application to-be-upgraded.

At block 305, an upgrade request is sent to the hotspot, where the upgrade request carries information for indicating the total traffic.

The terminal can send the upgrade request to the hotspot, where the upgrade request carries the information for indicating the total traffic. Assuming that the hotspot has been set, for example, to grant the upgrade request under the condition that the traffic requested via the upgrade request is lower than a preset threshold, the hotspot can automatically send a confirmation message to the terminal in response to the upgrade request. Certainly, the hotspot usually grants the upgrade request of the terminal in response to a permission instruction. As an example, the hotspot receives a confirmation instruction and sends the confirmation message to the terminal in response to the upgrade request.

At block 306, the at least one application to-be-upgraded is upgraded upon receipt of the confirmation message that is transmitted by the hotspot in response to the upgrade request.

The terminal can upgrade the at least one application to-be-upgraded upon receipt of the confirmation message that is transmitted by the hotspot in response to the upgrade request.

In the illustrated embodiment, the at least one application to-be-upgraded includes multiple applications to-be-upgraded. For the operation at block 306, the at least one application to-be-upgraded is upgraded as follows.

A usage frequency of each application to-be-upgraded is obtained. All the applications to-be-upgraded are upgraded in descending order of the usage frequencies of the applications to-be-upgraded. The usage frequency of each application to-be-upgraded can be obtained by recording usage of each application to-be-upgraded within a period (e.g., one month).

When the at least one application to-be-upgraded includes multiple applications to-be-upgraded, the usage frequency of each application to-be-upgraded can be obtained, and all the applications to-be-upgraded are upgraded in the descending order of the usage frequencies of the applications to-be-upgraded. For example, the applications to-be-upgraded include an App A, an App B, and an App C, where the usage frequency of the App B is greater than that of the App A, and the usage frequency of the App A is greater than that of the App C. In this case, the App B is upgraded first, the App A is then upgraded after upgrading the App B, and after upgrading the App A, the App C is upgraded.

In the illustrated embodiment, the at least one application to-be-upgraded includes multiple applications to-be-upgraded. For the operation at block 306, the at least one application to-be-upgraded is upgraded as follows.

Traffic required by upgrade of each application to-be-upgraded is determined. All the applications to-be-upgraded are upgraded in ascending order of the traffic required by upgrade of each application to-be-upgraded.

When the at least one application to-be-upgraded includes multiple applications to-be-upgraded, the traffic required by upgrade of each application to-be-upgraded can be determined, and all the applications to-be-upgraded are upgraded in ascending order of the traffic required by upgrade of each application to-be-upgraded. For instance, the applications to-be-upgraded include the App A, the App B, and the App C, where the traffic required by upgrading the App B is greater than that of the App A, and the traffic required by upgrading the App A is greater than that of the App C. In this situation, the App C is upgraded first, the App A is then upgraded after upgrading the App C, and after upgrading the App A, the App B is upgraded.

In the illustrated embodiment, when the at least one application to-be-upgraded includes multiple applications to-be-upgraded, part of the multiple applications to-be-upgraded may be upgraded first, and then the remaining applications may be upgraded.

In the illustrated embodiment, the at least one application to-be-upgraded includes multiple applications to-be-upgraded. For the operation at block 306, the at least one application to-be-upgraded is upgraded as follows.

Multiple categories are obtained by classifying the multiple applications to-be-upgraded. A priority of each of the multiple categories is determined. All the applications to-be-upgraded are upgraded according to the priority of each of the multiple categories, for example, according to descending order of the priorities of the multiple categories. The applications to-be-upgraded can be classified according to a preset criterion, for example, according to application types of the applications to-be-upgraded. The application types may include a map application type, an instant messenger application type, a payment application type, and so on, and the applications of the same application type belong to the same category. The application type of an application can be set in advance. For example, the application type of an application 1 and an application 2 can be set to be an application type 1 in advance, and the application type of an application 3 and an application 4 can be set to be an application type 2 in advance. The priority of each category can be determined according to a mapping relationship between application types and priorities pre-stored in the terminal.

When the at least one application to-be-upgraded includes multiple applications to-be-upgraded, the multiple categories can be obtained by classifying the multiple applications to-be-upgraded. The priority of each of the multiple categories can be determined. All the applications to-be-upgraded can be upgraded according to the priority of each of the multiple categories. Therefore, the multiple applications can be upgraded according to the priorities of the categories.

According to the embodiment of the present disclosure, the IP address of the gateway is obtained when the terminal is in the Wi-Fi connection state. Whether the preset Wi-Fi list contains the IP address is determined. The terminal is determined to be connected to the hotspot when the preset Wi-Fi list contains the IP address. The total traffic required to upgrade the at least one application to-be-upgraded is estimated. The upgrade request is sent to the hotspot, where the upgrade request carries the information for indicating the total traffic. The at least one application to-be-upgraded is upgraded upon receipt of the confirmation message that is transmitted by the hotspot in response to the upgrade request. Therefore, whether the terminal is connected to the hotspot configured via the mobile communication network or the access point configured via the router can be distinguished. Moreover, in the case that the terminal is connected to the hotspot, the total traffic required to upgrade the at least one application to-be-upgraded can be estimated, and the upgrade operation is performed only after receiving the confirmation message transmitted by the hotspot, thereby avoiding undesired charging of traffic consumed by application upgrade.

Figure 4:
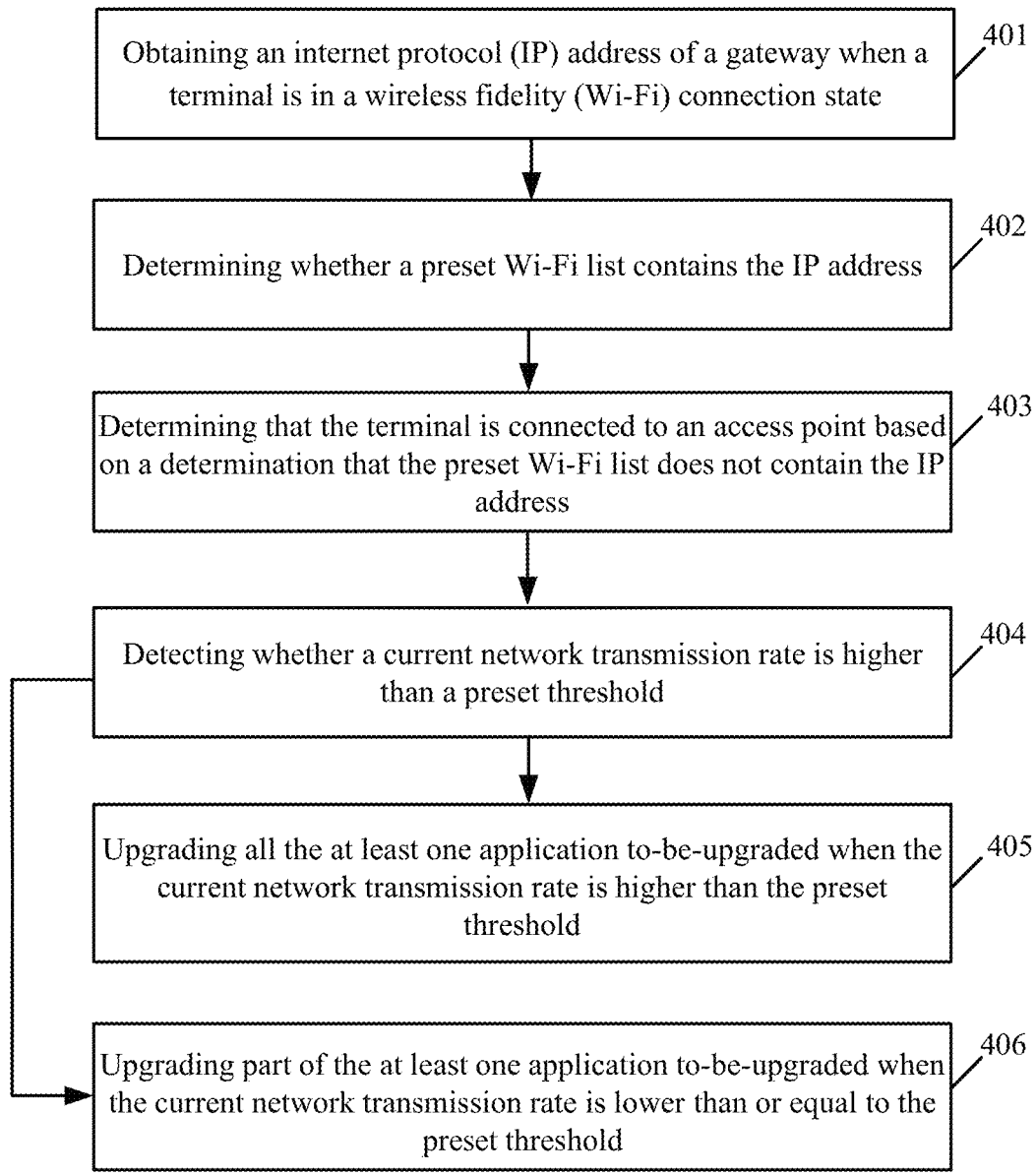
FIG. 4 is a flow chart illustrating a method for identifying an access point and a hotspot according to a third embodiment of the present disclosure.

Consistent with the above embodiment, FIG. 4 is a flow chart illustrating a method for identifying an access point and a hotspot according to a third embodiment of the present disclosure. The method provided in the third embodiment includes the following.

At block 401, an IP address of a gateway is obtained when a terminal is in a Wi-Fi connection state.

At block 402, whether a preset Wi-Fi list contains the IP address is determined.

At block 403, the terminal is determined to be connected to an access point based on a determination that the preset Wi-Fi list does not contain the IP address.

For the operations at block 401 to 403, reference can be made to the corresponding operations of the method described in conjunction with FIG. 1, which will not be repeated herein.

At block 404, whether a current network transmission rate is higher than a preset threshold is determined.

The preset threshold herein may be defaulted by a system or set by a user. The current network transmission rate may be a network transmission rate at current time, or certainly may be an average value of network transmission rates in a preset period. Generally, the network transmission rate is not stable enough, that is, sometimes the network transmission rate is high, and sometimes the network transmission rate is slow. Therefore, an average network transmission rate in a period can be used as the current network transmission rate. The preset period herein may be a period closest to the current time, so that the network transmission rate can be obtained accurately.

At block 405, all the at least one application to-be-upgraded is upgraded based on a determination that the current network transmission rate is higher than the preset threshold.

In the illustrated embodiment, all the at least one application to-be-upgraded involved in the above operation for upgrading all the at least one application to-be-upgraded can be specified by a user. For example, an App A, an App B, an App C, and an App D that need to be upgraded are displayed on a display screen of the terminal, and the App A, the App C, and the App D may be selected by the user to be upgraded. Considering that, as to some applications, an upgraded version provides a poor user experience, these applications may not be selected to be upgraded.

In the illustrated embodiment, the at least one application to-be-upgraded may include one or more applications. Applications that need to be upgraded are collectively referred to as applications to-be-upgraded. For different applications, traffic that needs to be consumed during upgrade operation may be different. Therefore, the traffic that needs to be consumed during upgrade operation of each application to-be-upgraded needs to be estimated. The at least one application to-be-upgraded includes, but is not limited to, a map application, an instant messenger application, a social application, a group purchase application, a browser application, a payment application, and the like. The at least one application to-be-upgraded may include one or more applications to-be-upgraded.

In the illustrated embodiment, when the at least one application to-be-upgraded includes multiple applications to-be-upgraded, a usage frequency of each application to-be-upgraded can be obtained, and all the applications to-be-upgraded are upgraded in descending order of the usage frequencies of the applications to-be-upgraded. For example, the applications to-be-upgraded include the App A, the App B, and the App C, where the usage frequency of the App B is greater than that of the App A, and the usage frequency of the App A is greater than that of the App C. In this case, the App B is upgraded first, the App A is then upgraded after upgrading the App B, and after upgrading the App A, the App C is upgraded.

In the illustrated embodiment, when the at least one application to-be-upgraded includes multiple applications to-be-upgraded, traffic required by upgrade of each application to-be-upgraded can be determined, and all the applications to-be-upgraded are upgraded in ascending order of the traffic required by upgrade of each application to-be-upgraded. For instance, the applications to-be-upgraded include the App A, the App B, and the App C, where the traffic required by upgrading the App B is greater than that of the App A, and the traffic required by upgrading the App A is greater than that of the App C. In this situation, the App C is upgraded first, the App A is then upgraded after upgrading the App C, and after upgrading the App A, the App B is upgraded.

In the illustrated embodiment, when the at least one application to-be-upgraded includes multiple applications to-be-upgraded, part of the multiple applications to-be-upgraded may be upgraded first, and then the remaining applications may be upgraded.

In the illustrated embodiment, when the at least one application to-be-upgraded includes multiple applications to-be-upgraded, multiple categories can be obtained by classifying the multiple applications to-be-upgraded. A priority of each of the multiple categories is determined. All the applications to-be-upgraded are upgraded according to the priority of each of the multiple categories. Therefore, the applications to-be-upgraded can be upgraded according to the priorities of the categories.

At block 406, part of the at least one application to-be-upgraded can be upgraded based on a determination that the current network transmission rate is lower than or equal to the preset threshold.

When the current network transmission rate is lower than or equal to the preset threshold, part of the at least one application to-be-upgraded can be upgraded. Part of the at least one application to-be-upgraded may also include two or more applications to-be-upgraded, and so different applications can be upgraded sequentially. Certainly, in the case that the number of applications to-be-upgraded is small, all the applications to-be-upgraded can be upgraded simultaneously.

For the operation at block 406, part of the applications to-be-upgraded can be upgraded as follows.

61) A usage frequency of each of the applications to-be-upgraded is determined.

62) Each application to-be-upgraded that has the usage frequency higher than a preset frequency threshold is upgraded.

The usage frequency of each application to-be-upgraded can be obtained, and all the applications to-be-upgraded can be upgraded in descending order of the usage frequencies of all of the applications to-be-upgraded. For example, the applications to-be-upgraded include the App A, the App B, and the App C, where the usage frequency of the App B is greater than that of the App A, and the usage frequency of the App A is greater than that of the App C. In this case, the App B is upgraded first, the App A is then upgraded after upgrading the App B, and after upgrading the App A, the App C is upgraded.

By adopting the embodiment of the present disclosure, the IP address of the gateway is obtained when the terminal is in the Wi-Fi connection state. Whether the preset Wi-Fi list contains the IP address is determined. The terminal is determined to be connected to the access point when the preset Wi-Fi list does not contain the IP address. Whether the current network transmission rate is higher than the preset threshold is determined. All the at least one application to-be-upgraded can be upgraded when the current network transmission rate is higher than the preset threshold. Part of the at least one application to-be-upgraded can be upgraded when the current network transmission rate is lower than or equal to the preset threshold. Therefore, whether the terminal is connected to the hotspot configured by the mobile communication network or the access point configured by the router can be distinguished. In the case that the terminal is connected to the access point, upgrading part of or all the at least one application to-be-upgraded can be determined according to the current network transmission rate, thereby ensuring successful upgrade of part of or all the application to-be-upgraded.

Consistent with the above embodiment, a device configured to implement the above method for identifying an access point and a hotspot is provided herein below.

Figure 5:
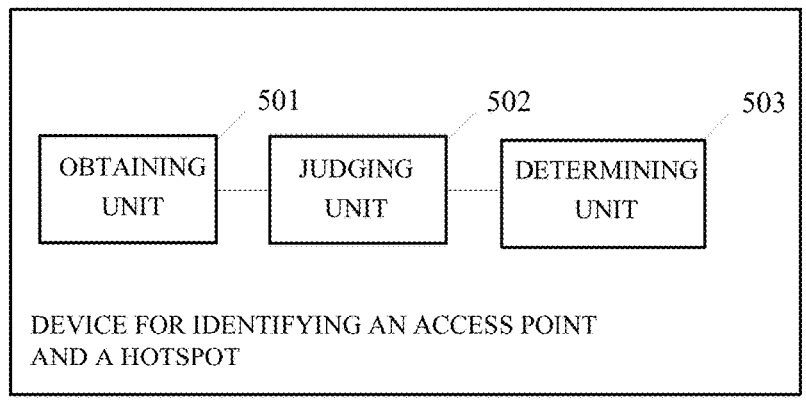
FIG. 5 is a functional block diagram illustrating a device for identifying an access point and a hotspot according to an embodiment of the present disclosure.

FIG. 5 is a schematic structural diagram illustrating a device for identifying an access point and a hotspot according to an embodiment of the present disclosure. The device provided in this embodiment includes an obtaining unit 501, a judging unit 502, and a determining unit 503.

The obtaining unit 501 is configured to obtain an IP address of a gateway when a terminal is in a Wi-Fi connection state.

The judging unit 502 is configured to judge whether a preset Wi-Fi list contains the IP address.

The determining unit 503 is configured to determine that the terminal is connected to a hotspot when the judging unit 502 judges that the preset Wi-Fi list contains the IP address.

The determining unit 503 is further configured to determine that the terminal is connected to an access point when the judging unit 502 judges that the preset Wi-Fi list does not contain the IP address.

In the illustrated embodiment, the preset Wi-Fi list contains at least one of 192.168.40.X and 172.20.19.Y, where X and Y are integers ranging from 0 to 255.

Figure 6:
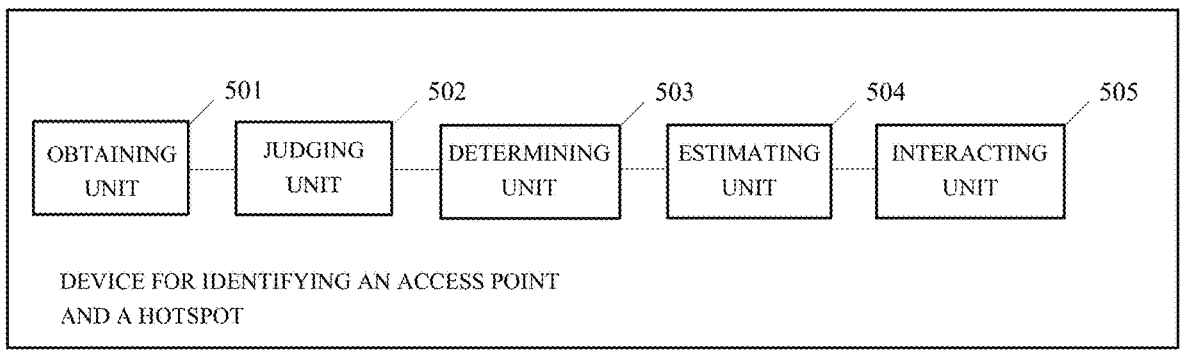
FIG. 6 is another functional block diagram illustrating the device illustrated in FIG. 5 according to an embodiment of the present disclosure.

In the illustrated embodiment, FIG. 6 illustrates a device that is a modification of the device illustrated in FIG. 5. Compared with FIG. 5, the device illustrated in FIG. 6 further includes an estimating unit 504 and an interacting unit 505.

The estimating unit 504 is configured to estimate total traffic required to upgrade the at least one application to-be-upgraded after the determining unit 503 determines that the terminal is connected to the hotspot.

The interacting unit 505 is configured to send an upgrade request to the hotspot, where the upgrade request carries information for indicating the total traffic.

The interacting unit 505 is further configured to upgrade the at least one application to-be-upgraded upon receipt of a confirmation message that is transmitted by the hotspot in response to the upgrade request.

The at least one application to-be-upgraded includes multiple applications to-be-upgraded. The estimating unit 504 is configured to estimate traffic required by upgrade of each application to-be-upgraded, and to obtain the total traffic by adding up the traffic required by upgrade of each application to-be-upgraded.

Figure 7:
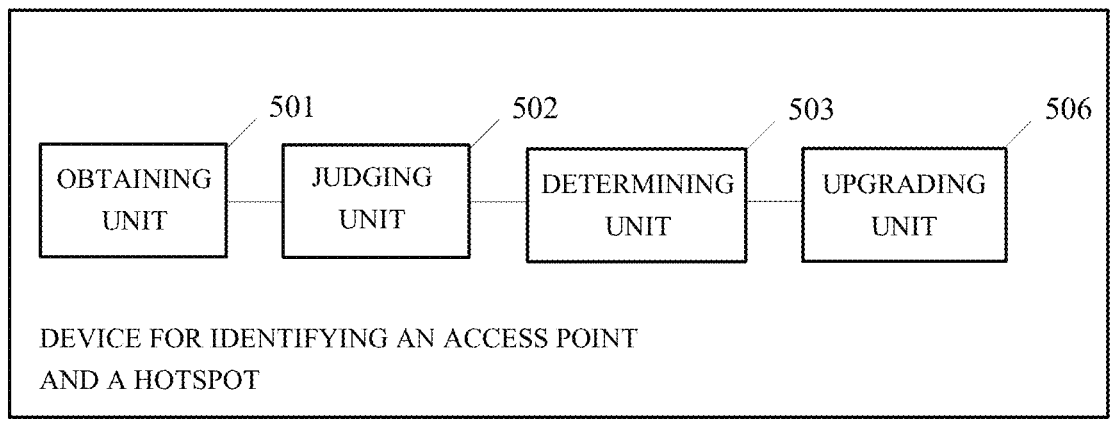
FIG. 7 is yet another functional block diagram illustrating the device illustrated in FIG. 5 according to an embodiment of the present disclosure.

FIG. 7 illustrates yet another device that is a modification of the device illustrated in FIG. 5. Compared with FIG. 5, the device illustrated in FIG. 7 further includes an upgrading unit 506.

The upgrading unit 506 is configured to upgrade the at least one application to-be-upgraded after the determining unit 503 determines that the terminal is connected to the access point.

Figure 8:
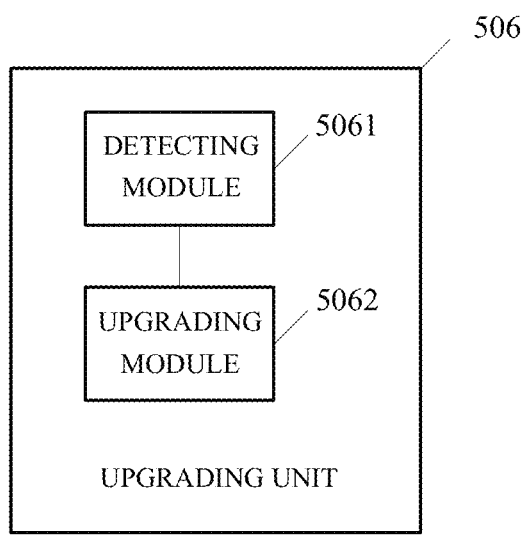
FIG. 8 is a functional block diagram illustrating an upgrading unit of the device illustrated in FIG. 7 according to an embodiment of the present disclosure.

FIG. 8 is a schematic structural diagram illustrating the upgrading unit 506 of the device illustrated in FIG. 7. The upgrading unit 506 includes a detecting module 5061 and an upgrading module 5062.

The detecting module 5061 is configured to detect whether a current network transmission rate is higher than a preset threshold.

The upgrading module 5062 is configured to upgrade all the at least one application to-be-upgraded when the current network transmission rate is higher than the preset threshold.

The upgrading module 5062 is further configured to upgrade part of the at least one application to-be-upgraded when the current network transmission rate is lower than or equal to the preset threshold.

In the illustrated embodiment, the at least one application to-be-upgraded includes multiple applications to-be-upgraded, and the upgrading unit 506 is configured to obtain a usage frequency of each application to-be-upgraded, and to upgrade all the applications to-be-upgraded in descending order of the usage frequencies of the applications to-be-upgraded.

In the illustrated embodiment, the at least one application to-be-upgraded includes multiple applications to-be-upgraded. The upgrading unit 506 is configured to determine traffic required by upgrade of each application to-be-upgraded, and to upgrade all the applications to-be-upgraded in ascending order of the traffic required by upgrade of each application to-be-upgraded.

In the illustrated embodiment, the at least one application to-be-upgraded includes multiple applications to-be-upgraded. The upgrading unit 506 is configured to obtain multiple categories by classifying the multiple applications to-be-upgraded, to determine a priority of each of the multiple categories, and to upgrade all the applications to-be-upgraded according to the priority of each of the multiple categories.

It can be seen that, by means of the devices described in the embodiments of the present disclosure, the IP address of the gateway is obtained when the terminal is in the Wi-Fi connection state. Whether the preset Wi-Fi list contains the IP address is determined. The terminal is determined to be connected to the hotspot when the preset Wi-Fi list contains the IP address. The terminal is determined to be connected to the access point when the preset Wi-Fi list does not contain the IP address. Therefore, whether the terminal is connected to the hotspot configured via the mobile communication network or the access point configured via the router can be distinguished.

What needs to be noted is that the devices described in the embodiments of the disclosure are presented in the form of functional units. The term "unit" used herein should be understood as the broadest meaning as possible, and an object for achieving functions defined by each "unit" may be, for example, an application-specific integrated circuit (ASIC), a single circuit, a processor (shared, dedicated, or chipset) for executing one or more software or firmware programs and a memory, a combinational logic circuit, and/or other suitable components that can achieve the above described functions.

Figure 9:
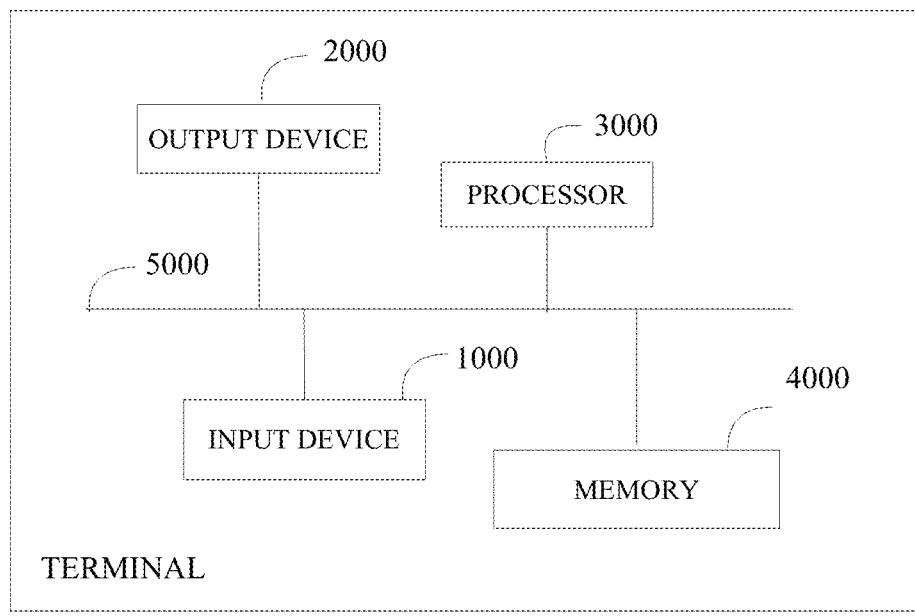
FIG. 9 is a functional block diagram illustrating a terminal according to an embodiment of the present disclosure.

As an example, when the IP address of the terminal has a validity period less than a preset threshold, a sending unit (not illustrated) configured to send an IP address renewal request to a first DHCP server within a preset period can be implemented by a terminal illustrated in FIG. 9. A processor 3000 can invoke executable program codes in a memory 4000 to send the IP address renewal request to the first DHCP server within the preset period when the IP address of the terminal has the validity period less than the preset threshold.

Consistent with the above embodiments, FIG. 9 is a schematic structural diagram illustrating a terminal according to an embodiment of the present disclosure. The terminal in the embodiment includes at least one input device 1000, at least one output device 2000, at least one processor 3000 (such as a CPU), and a memory 4000. The input device 1000, the output device 2000, the processor 3000, and the memory 4000 are coupled with each other via a bus 5000.

In the illustrated embodiment, the at least one input device 1000 may be a touch panel, a physical button, a mouse, or the like.

In the illustrated embodiment, the at least one output device 2000 may be a display screen.

In the illustrated embodiment, the memory 4000 may be a high speed RAM memory, or may be a non-volatile memory such as a disk memory. The memory 4000 is configured to store a set of program codes. The input device 1000, the output device 2000, and the processor 3000 are configured to invoke the program codes stored in the memory 4000 to carry out the following.

The processor 3000 is configured to obtain an IP address of a gateway when the terminal is in a Wi-Fi connection state, to determine whether a preset Wi-Fi list contains the IP address, to determine that the terminal is connected to a hotspot when the preset Wi-Fi list contains the IP address, and to determine that the terminal is connected to an access point when the preset Wi-Fi list does not contain the IP address.

The preset Wi-Fi list contains at least one of 192.168.40.X and 172.20.19.Y, where X and Y are integers ranging from 0 to 255.

After determining that the terminal is connected to the hotspot, the processor 3000 is further configured to estimate total traffic required to upgrade at least one application to-be-upgraded, to send an upgrade request to the hotspot, where the upgrade request carries information for indicating the total traffic, and to upgrade the at least one application to-be-upgraded upon receipt of a confirmation message that is transmitted by the hotspot in response to the upgrade request.

The at least one application to-be-upgraded includes multiple applications to-be-upgraded. The processor 3000 configured to estimate the total traffic required to upgrade the at least one application to-be-upgraded is configured to estimate traffic required by upgrade of each application to-be-upgraded, and to obtain the total traffic by adding up the traffic required by upgrade of each application to-be-upgraded.

After determining that the terminal is connected to the access point, the processor 3000 is further configured to upgrade at least one application to-be-upgraded.

In the illustrated embodiment, the processor 3000 configured to upgrade the at least one application to-be-upgraded is configured to detect whether a current network transmission rate is higher than a preset threshold, to upgrade all the at least one application to-be-upgraded when the current network transmission rate is higher than the preset threshold, and to upgrade part of the at least one application to-be-upgraded when the current network transmission rate is lower than or equal to the preset threshold.

In the illustrated embodiment, the at least one application to-be-upgraded includes multiple applications to-be-upgraded. The processor 3000 configured to upgrade the at least one application to-be-upgraded is configured to obtain a usage frequency of each application to-be-upgraded, and to upgrade all the applications to-be-upgraded in descending order of the usage frequencies of the applications to-be-upgraded.

In the illustrated embodiment, the at least one application to-be-upgraded includes multiple applications to-be-upgraded. The processor 3000 configured to upgrade the at least one application to-be-upgraded is configured to determine traffic required by upgrade of each application to-be-upgraded, and to upgrade all the applications to-be-upgraded in ascending order of the traffic required by upgrade of each application to-be-upgraded.

In the illustrated embodiment, the at least one application to-be-upgraded includes multiple applications to-be-upgraded. The processor 3000 configured to upgrade the at least one application to-be-upgraded is configured to obtain multiple categories by classifying the multiple applications to-be-upgraded, to determine a priority of each of the multiple categories, and to upgrade all the applications to-be-upgraded according to the priority of each of the multiple categories.

Embodiments of the present disclosure further provide a computer storage medium. The computer storage medium is configured to store programs which, when executed, are operable to implement part or all of operations of the methods described in the foregoing method embodiments.

Embodiments of the present disclosure further provide a computer program product. The computer program product includes a non-transitory computer readable storage medium configured to store computer programs. The computer programs are operable with a computer to implement part or all of operations of the methods described in the foregoing method embodiments.

Although the present disclosure has been described herein in combination with various embodiments of the present disclosure, in the process of implementing the disclosure seeking for protection, those skilled in the art will understand and derive other embodiments based on the specification, the claims, and the accompanying drawings of the present disclosure as viewed. The term "comprising" in the claims does not exclude other components or steps. In addition, the term "a/an" or "one" does not exclude a plurality of components or steps. A single processor or other units may fulfill several functions described in the claims. Certain technical features are described in different dependent claims, however, combinations of these technical features can be made to achieve a good effect.

Those skilled in the art will appreciate that embodiments of the present disclosure can be provided as a method, an apparatus (device), or a computer program product. Accordingly, the above embodiments of present disclosure may be implemented through hardware, software, or any other combination thereof. In addition, the present disclosure may take the form of a computer program product embodied on one or more computer readable storage medium (including but not limited to a disk memory, a CD-ROM, an optical memory, etc.) including computer readable program codes. Computer programs are stored or distributed in a suitable medium, and are provided together with other hardware or are as part of certain hardware, or are distributed in other forms, such as an Internet-based form, other wired or wireless telecommunication-system-based form, or the like.

The present disclosure has been described with reference to flow charts and/or block diagrams of the methods, apparatuses (devices), and computer program products of the embodiments of the disclosure. It will be understood that computer program instructions are operable to implement each procedure of the flow charts and/or each block of the block diagrams, and to implement a combination thereof. These computer program instructions can be provided for a processor of a general-purpose computer, a special-purpose computer, an embedded processor, or other programmable data processing devices to produce a machine, to enable instructions executed by a processor of a computer or other programmable data processing devices to produce a device for implementing functions specified in one or more procedures of the flow charts or one or more blocks of the block diagrams.

These computer program instructions can also be stored in a computer readable memory that can direct a computer or other programmable data processing devices to operate in a certain manner, to enable instructions stored in the computer readable memory to produce an article of manufacture including an instruction device for implementing functions specified in one or more procedures of the flow charts or one or more blocks of the block diagrams.

These computer program instructions can also be loaded into a computer or other programmable data processing devices, to enable a computer or other programmable devices to perform a series of operational steps to achieve computer processing, such that instructions executed on a computer or other programmable devices can provide steps for implementing functions specified in one or more procedures of the flow charts or one or more blocks of the block diagrams.

While the disclosure has been described with respect to the specific features and embodiments thereof, it should be understood that various modifications and combinations can be made herein without departing from the spirit and scope of the disclosure. Accordingly, the specification and the accompanying drawings are merely illustrative illustration of the disclosure as defined by the claims attached, and can be regarded as covering any and all modifications, variations, combinations or equivalents within the scope of the disclosure. It will be apparent that those skilled in the art can make various modifications and variations to the disclosure without departing from the spirit and scope of the disclosure. Thus, it is intended that the present disclosure covers such modifications and variations thereof on the basis of such modifications and variations falling within the scope of the claims and the equivalents thereof.

What is claimed is:

1. A method for identifying a hotspot, comprising:
   obtaining an internet protocol (IP) address of a gateway when a terminal is in a wireless fidelity (Wi-Fi) connection state;
   determining whether a preset Wi-Fi list contains the IP address;
   determining that the terminal is connected to a hotspot, wherein the hotspot is created by a physical device, based on a determination that the preset Wi-Fi list contains the IP address;
   determining that the terminal is connected to an access point, wherein the access point is another physical device and comprises a router, based on a determination that the preset Wi-Fi list fails to contain the IP address; and
   the method further comprising:
      after determining that the terminal is connected to the hotspot:
      estimating total traffic required to upgrade at least one application to-be-upgraded;
      sending an upgrade request to the hotspot, the upgrade request carrying information for indicating the total traffic; and
      upgrading the at least one application to-be-upgraded upon receipt of a confirmation message that is transmitted by the hotspot in response to the upgrade request.

2. The method of claim 1, wherein the preset Wi-Fi list contains at least one of 192.168.40.X and 172.20.19.Y, and wherein X and Y are integers ranging from 0 to 255.

3. The method of claim 1, wherein the at least one application to-be-upgraded comprises a plurality of applications to-be-upgraded, and estimating the total traffic required to upgrade the at least one application to-be-upgraded comprises:
   estimating traffic required by upgrade of each of the plurality of applications to-be-upgraded; and
   obtaining the total traffic by adding up the traffic required by upgrade of each of the plurality of applications to-be-upgraded.

4. The method of claim 1, wherein the at least one application to-be-upgraded comprises a plurality of applications to-be-upgraded, and upgrading the at least one application to-be-upgraded comprises:
   obtaining a usage frequency of each of the plurality of applications to-be-upgraded; and
   upgrading all the plurality of applications to-be-upgraded in descending order of the usage frequency of each of the plurality of applications to-be-upgraded.

5. The method of claim 1, wherein the at least one application to-be-upgraded comprises a plurality of applications to-be-upgraded, and upgrading the at least one application to-be-upgraded comprises:
   determining traffic required by upgrade of each of the plurality of applications to-be-upgraded; and
   upgrading all the plurality of applications to-be-upgraded in ascending order of the traffic required by upgrade of each of the plurality of applications to-be-upgraded.

6. The method of claim 1, wherein the at least one application to-be-upgraded comprises a plurality of applications to-be-upgraded, and upgrading the at least one application to-be-upgraded comprises:
   obtaining a plurality of categories by classifying the plurality of applications to-be-upgraded;
   determining a priority of each of the plurality of categories; and
   upgrading all the plurality of applications to-be-upgraded according to the priority of each of the plurality of categories.

7. The method of claim 1, further comprising:
   after determining that the terminal is connected to the access point, upgrading at least one application to-be-upgraded.

8. The method of claim 7, wherein upgrading the at least one application to-be-upgraded comprises:
   determining whether a current network transmission rate is higher than a preset threshold;

upgrading all the at least one application to-be-upgraded based on a determination that the current network transmission rate is higher than the preset threshold; and upgrading part of the at least one application to-be-upgraded based on a determination that the current network transmission rate is lower than or equal to the preset threshold.

9. A terminal comprising:

at least one processor; and a computer readable memory, coupled to the at least one processor and storing at least one computer executable instruction therein, which when executed by the at least one processor, cause the at least one processor to carry out actions, comprising:

obtaining an IP address of a gateway when the terminal is in a Wi-Fi connection state;

determining whether a preset Wi-Fi list contains the IP address;

determining that the terminal is connected to a hotspot, wherein the hotspot is created by a physical device, based on a determination that the preset Wi-Fi list contains the IP address;

determining that the terminal is connected to an access point, wherein the access point is another physical device and comprises a router, based on a determination that the preset Wi-Fi list fails to contain the IP address; and the at least one computer executable instruction further causing the at least one processor to carry out the following actions:

after determining that the terminal is connected to the hotspot:

estimating total traffic required to upgrade at least one application to-be-upgraded based on a determination that the terminal is connected to the hotspot;

sending an upgrade request to the hotspot, the upgrade request carrying information for indicating the total traffic; and upgrading the at least one application to-be-upgraded upon receipt of a confirmation message that is transmitted by the hotspot in response to the upgrade request.

10. The terminal of claim 9, wherein the preset Wi-Fi list contains at least one of 192.168.40.X and 172.20.19.Y, and wherein X and Y are integers ranging from 0 to 255.

11. The terminal of claim 9, wherein the at least one application to-be-upgraded comprises a plurality of applications to-be-upgraded, and the at least one processor carrying out the action of upgrading the at least one application to-be-upgraded is caused to carry out actions, comprising:

obtaining a usage frequency of each of the plurality of applications to-be-upgraded; and upgrading all the plurality of applications to-be-upgraded in descending order of the usage frequency of each of the plurality of applications to-be-upgraded.

12. The terminal of claim 9, wherein the at least one application to-be-upgraded comprises a plurality of applications to-be-upgraded, and the at least one processor carrying out the action of upgrading the at least one application to-be-upgraded is caused to carry out actions, comprising:

determining the traffic required by upgrade of each of the plurality of applications to-be-upgraded; and upgrading all the plurality of applications to-be-upgraded in ascending order of the traffic required by upgrade of each of the plurality of applications to-be-upgraded.

13. The terminal of claim 9, wherein the at least one application to-be-upgraded comprises a plurality of applications to-be-upgraded, and the at least one processor carrying out the action of upgrading the at least one application to-be-upgraded is caused to carry out actions, comprising:

obtaining a plurality of categories by classifying the plurality of applications to-be-upgraded;

determining a priority of each of the plurality of categories; and upgrading all the plurality of applications to-be-upgraded according to the priority of each of the plurality of categories.

14. The terminal of claim 9, wherein the at least one computer executable instruction further causes the at least one processor to carry out an action, comprising:

upgrading at least one application to-be-upgraded.

15. The terminal of claim 14, wherein the at least one application to-be-upgraded comprises a plurality of applications to-be-upgraded, and the at least one processor carrying out the action of upgrading at least one application to-be-upgraded is caused to carry out actions, comprising:

determining whether a current network transmission rate is higher than a preset threshold;

upgrading all the plurality of applications to-be-upgraded based on a determination that the current network transmission rate is higher than the preset threshold; and upgrading part of the plurality of applications to-be-upgraded based on a determination that the current network transmission rate is lower than or equal to the preset threshold.

16. A non-transitory computer-readable storage medium storing at least one computer program which, when executed by at least one processor, causes the at least one processor to carry out actions, comprising:

obtaining an internet protocol (IP) address of a gateway when a terminal is in a wireless fidelity (Wi-Fi) connection state;

determining whether a preset Wi-Fi list contains the IP address;

determining that the terminal is connected to a hotspot, wherein the hotspot is created by a physical device, based on a determination that the preset Wi-Fi list contains the IP address;

determining that the terminal is connected to an access point, wherein the access point is another physical device and comprises a router, based on a determination that the preset Wi-Fi list fails to contain the IP address; and the at least one computer program being further executed by the at least one processor to carry out the following actions:

after determining that the terminal is connected to the hotspot:

estimating total traffic required to upgrade at least one application to-be-upgraded based on a determination that the terminal is connected to the hotspot;

sending an upgrade request to the hotspot, the upgrade request carrying information for indicating the total traffic; and upgrading the at least one application to-be-upgraded upon receipt of a confirmation message that is transmitted by the hotspot in response to the upgrade request.

17. The non-transitory computer-readable storage medium of claim 16, wherein the at least one application to-be-upgraded comprises a plurality of applications to-beupgraded, the at least one computer program executed by the processor to carry out the action of upgrading the at least one application to-be-upgraded is executed by the processor to carry out actions, comprising:
- obtaining a usage frequency of each of the plurality of applications to-be-upgraded; and
- upgrading all the plurality of applications to-be-upgraded in descending order of the usage frequency of each of the plurality of applications to-be-upgraded.

18. The non-transitory computer-readable storage medium of claim 16, wherein the at least one application to-be-upgraded comprises a plurality of applications to-be-upgraded, the at least one computer program executed by the processor to carry out the action of upgrading the at least one application to-be-upgraded is executed by the processor to carry out actions, comprising:
- determining traffic required by upgrade of each of the plurality of applications to-be-upgraded; and
- upgrading all the plurality of applications to-be-upgraded in ascending order of the traffic required by upgrade of each of the plurality of applications to-be-upgraded.

19. The non-transitory computer-readable storage medium of claim 16, wherein the at least one application to-be-upgraded comprises a plurality of applications to-be-upgraded, the at least one computer program executed by the processor to carry out the action of upgrading the at least one application to-be-upgraded is executed by the processor to carry out actions, comprising:
- obtaining a plurality of categories by classifying the plurality of applications to-be-upgraded;
- determining a priority of each of the plurality of categories; and
- upgrading all the plurality of applications to-be-upgraded according to the priority of each of the plurality of categories.

20. The non-transitory computer-readable storage medium of claim 16, wherein the at least one application to-be-upgraded comprises a plurality of applications to-be-upgraded, the at least one computer program executed by the processor to carry out the action of estimating the total traffic required to upgrade the at least one application to-be-upgraded is executed by the processor to carry out actions, comprising:
- estimating traffic required by upgrade of each of the plurality of applications to-be-upgraded; and
- obtaining the total traffic by adding up the traffic required by upgrade of each of the plurality of applications to-be-upgraded.

* * * * *